United States Patent
Gelonese

(10) Patent No.: US 8,301,914 B2
(45) Date of Patent: Oct. 30, 2012

(54) POWER SUPPLY CONTROL DEVICE

(76) Inventor: Giuseppe Antonio Gelonese, Para Hills (AU)

( * ) Notice: Subject to any disclaimer, the term of this patent is extended or adjusted under 35 U.S.C. 154(b) by 685 days.

(21) Appl. No.: 12/473,023

(22) Filed: May 27, 2009

(65) Prior Publication Data

US 2009/0235107 A1    Sep. 17, 2009

Related U.S. Application Data

(63) Continuation-in-part of application No. PCT/AU2007/001824, filed on Nov. 27, 2007.

(51) Int. Cl.
*G03F 1/00* (2006.01)
(52) U.S. Cl. .................................................. 713/300
(58) Field of Classification Search ................... 713/300
See application file for complete search history.

(56) References Cited

U.S. PATENT DOCUMENTS

| | | | |
|---|---|---|---|
| 4,675,537 A | 6/1987 | Mione | |
| 5,731,947 A | 3/1998 | Hirose | |
| 2004/0215990 A1 | 10/2004 | Allen et al. | |
| 2006/0175903 A1* | 8/2006 | Palmer et al. | 307/39 |

FOREIGN PATENT DOCUMENTS

| | | |
|---|---|---|
| DE | 198 16 560 | 10/1999 |
| EP | 376 495 A2 | 7/1990 |
| EP | 0766167 | 4/1997 |
| FR | 2728074 | 6/1996 |
| GB | 2398441 | 2/2005 |
| WO | WO 02/14995 | 2/2002 |
| WO | WO 2003/062973 | 7/2003 |
| WO | WO 2005/111766 | 11/2005 |

* cited by examiner

*Primary Examiner* — Paul R Myers
*Assistant Examiner* — Jeremy S Cerullo
(74) *Attorney, Agent, or Firm* — Novak Druce & Quigg

(57) ABSTRACT

The present invention discloses a power supply control device to which can be attached a number of electrical device(s), such as a computer or AV equipment. The power supply device is able to determine and monitor standby power usage levels of the device(s) so that when the control device detects that the connected electrical device(s) are not being used power supply is removed from the device(s).

27 Claims, 9 Drawing Sheets

POWER SUPPLY CONTROL DEVICE

CROSS-REFERENCE TO RELATED APPLICATIONS

This application is a bypass continuation in part, which claims priority to International Application No. PCT/AU2007/001824, filed Nov. 27, 2007, which claims priority to Australian Patent Application No. 2006906617, filed Nov. 27, 2006, and U.S. Non-provisional application Ser. No. 11/569,329, filed Aug. 13, 2007, which is a §371 National Stage entry of International Application No. PCT/AU2005/000707, filed May 18, 2005, which claims priority to Australian Patent Application No 2004902643, filed May 19, 2004, all of which are hereby incorporated by reference.

TECHNICAL FIELD

This invention relates to the control of the supply of electrical power to plug-in electrical equipment, in particular to the control of the supply of electrical power to groups of such electrical equipment where the power supply requirement of these groups is related to the operational status of a main piece of electrical equipment.

BACKGROUND ART

A desktop computer installation typically has associated with it a number of peripheral devices and other associated electrical devices, each of which is separately electrically powered. The peripheral devices can include such things as printers, scanners and modems or there may be associated devices such as a desk lamp or a room heater.

These peripheral devices and associated electrical equipment are in general not used when the computer is not in use. However, because they are separately electrically powered the user must, when turning off the computer, also turn off each of the peripheral and associated devices. This is a time consuming process and indeed given the placement of the power switches on many such electrical devices, may be extremely inconvenient.

It is also the case that widely used computer operating systems require significant time to perform certain "housekeeping" tasks in between receiving command to shut down and actually shutting off the power or being in a position to have the power supply to the computer shut off without causing problems for the computer system. During this time, the computer system also may not tolerate having power removed from peripheral devices.

Accordingly many users simply leave the additional devices powered on after the computer has been shut down.

This is not ideal for a number of reasons. The first of these is that the devices continue to consume power which is both costly and a waste of resources. This is particularly a problem since many modern devices use small plug-in transformers to provide the lower operating voltages which they require. These plug-in transformers continue to consume power whilst they are connected to a mains supply even if the power switch on the device which they are supplying with power has been switched off. Newer power supplies use solid state switching devices but still consume about 0.5 W.

It is also the case that all electrical devices have a finite life span of operation and this life span can be made to extend over a longer period of time if the device is switched off when not in use.

It is also advantageous that mains power be removed from devices when not required in order to reduce the possibility of exposure to damaging surges in the mains power supply.

Prior art devices have attempted to deal with this problem by providing relays which cut off power to peripheral devices when no current is flowing to the main device, the main device being the desktop computer itself.

However, most modern desktop computers have the ability to control their power usage to some extent by entering one or more lower power consumption states, usually referred to as standby states. Users may allow the device to spend extended periods in such a standby state, negating most of the advantages of the prior art devices.

DISCLOSURE OF THE INVENTION

Accordingly there is proposed, in one form of the invention, a power supply control device for permitting energisation of a plurality of electrical devices from a single mains supply electrical outlet characterized in that there are provided a plurality of controlled electrical outlets and a single electrical input adapted to connect to a mains supply electrical output; switch means adapted to connect electrical supply from the supply electrical outlet to each of the controlled electrical outlets in response to the state of a master electrical device, a state sensor adapted to detect a functional state of a master electrical device, said sensor being adapted to distinguish at least two functional states of the master device by sensing the value of current flow through and voltage across the master device for calculation of the power consumption of the master device.

In another aspect, the invention provides a power supply control device for permitting energisation of a plurality of electrical devices from a single mains supply electrical outlet characterized in that there are provided a plurality of controlled electrical outlets; a single electrical input adapted to connect to a mains supply electrical output; a power sensor adapted to detect power use being current flow through and voltage across a master electrical device and to produce a power use signal, a computer processor adapted to process said power use signal to determine at least two functional states of the master electrical device, switch means controlled by the computer processor adapted to connect an electrical supply from the supply electrical outlet to each of the controlled electrical outlets, which of the controlled electrical outputs is controlled to be connected to the electrical supply being determined by the determined functional state.

The term "master device" as used herein may be a single electrical device or a number of electrical devices each requiring power supply. The term "master device" is intended to cover a combination of devices such as a computer, audio equipment, visual equipment, etc each of which is attached to the power supply device.

In the first aspect of the invention, the state sensor is adapted to sense the current flow through and voltage across the master device.

In the second aspect of the invention, the 'power sensor' measures True RMS power. The term "True RMS power" as used herein refers to an average measurement of power over a predefined period of time, regardless of waveform. The power sensor may be embodied in the form of an analogue electronic circuit which multiplies instantaneous voltage and current signals to derive a True RMS Power signal or by using a micro-controller to digitise the voltage and current signals and then multiplying, adding and averaging the sampled values to calculate the True RMS power value.

In preference the at least two functional states of the master device include a reduced power state hereafter called "standby", and fully on.

In preference, the master device includes the third functional state "off".

In preference the computer processor is adapted to receive digital information from the master device indicating its actual or intended functional state.

In preference the computer processor is adapted to monitor the state of any port of the master device in order to determine the functional state of the master device.

In preferred embodiments, monitoring may take place through any port, such as a serial port, a parallel port or a USB port.

One or more of a number of possible means may be used to detect the state of the master device. These may include the direct receipt of digital information from the master device indicating its actual or intended functional state.

It may also include connection to any one or more of the output ports of the master device which may include serial or parallel communication ports, USB ports, or any other port.

The modern desktop computer generally has a complex and relatively time consuming "power up sequence" which is the series of activities which the computer performs immediately upon being first switched on. This sequence may include activities to discover what peripheral devices are connected to the computer and to establish communication with such peripherals. One of the advantages of the standby mode is that it is not necessary for the computer to go through this power up sequence when it emerges from standby into fully powered mode.

However, this has the problem that some types of peripheral device cannot be switched off while the computer is in standby mode or the computer will lose the ability to communicate with such devices until a full power on sequence is performed.

Accordingly the controlled electrical outlets are controlled such that at least one controlled electrical outlet continues to provide an electrical power supply while the state or power sensor indicates that the master electrical device is in a standby state.

In preference at least one controlled electrical outlet is controlled such that it does not provide an electrical supply when the master electrical device is in a standby state, but does provide an electrical supply when the master device is in an on state. For example, a modem or an external disk drive would be connected in such a manner that power was not withdrawn from them when the computer is in a standby mode but a printer or a desk lamp might be connected such that they receive power only when the computer is in a fully on mode.

In preference in relation to the second aspect of the invention, at least one controlled electrical outlet continues to provide an electrical power supply while the master electrical device is in an off state.

In relation to the second aspect, preferably there are second switch means controlled by the computer processor adapted to remove mains power from the power supply control device, and power storage means sufficient to allow powering of circuitry to return power to the power supply control device when required by a user or external device.

Depending on the individual computer and its particular hardware configuration, the current or power drawn by the computer when in its standby mode may vary.

In connection with the first aspect, preferably the state sensor is adapted to permit the threshold power or current level at which it will indicate that the master electrical device is in a standby mode to be field resettable. It is further preferred that both the threshold power and current levels can be field resettable.

BRIEF DESCRIPTION OF THE DRAWINGS

The invention will now be described with reference to drawings wherein.

BEST MODE FOR CARRYING OUT THE INVENTION

Figure 1:
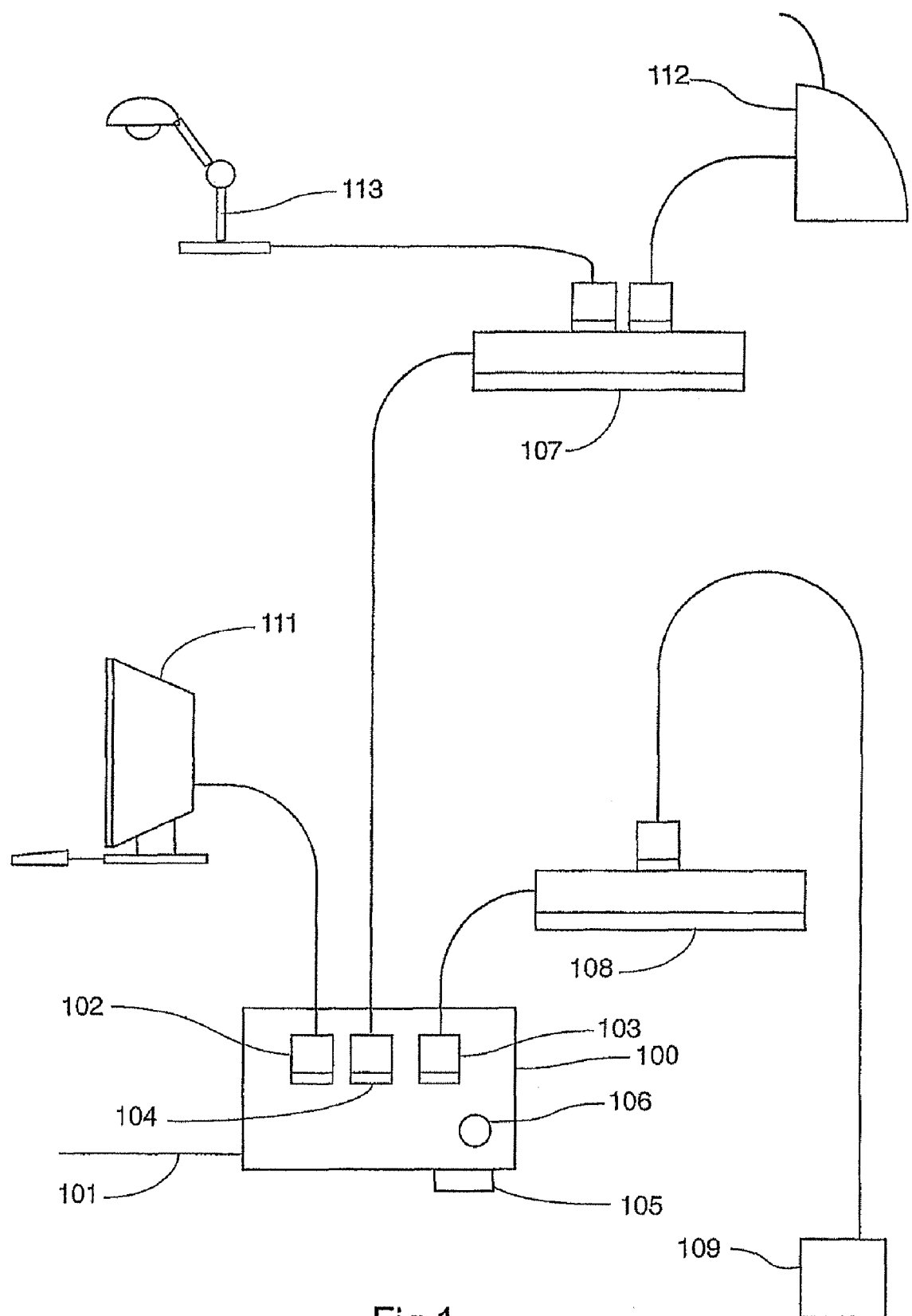
FIG. 1 is a pictorial representation of an embodiment of the invention, applicable to the first and second aspects.

Turning now to FIG. 1 there is shown a perspective drawing of a power supply control device according to an embodiment of the invention. There is a box 100 containing the working circuitry of the device. There is a power cord 101 which is connected to a general-purpose electrical outlet. There is a power outlet 102 which is in permanent electrical connection with the mains power supply to the device. The main device to be powered, in this case a personal computer 111 is connected to this outlet. It is to be understood that the main device could be any other electrical device whose state determines the power requirements for other associated devices.

There is a power outlet 104 which is available to have connected to it such electrical loads as require power only when the main computer is in a full power mode. A power board or power strip 107 is connected to this outlet in order to allow multiple devices to be powered in this manner. Exemplary devices of this class, being a printer 112 and a desk lamp 113 are shown.

There is a further electrical outlet 103 which is available for the connection of loads which require power when the computer is in a fully on or a standby mode but which do not require power when the main computer is switched off. A further power board or power strip 108 is connected to this outlet in order to allow multiple devices to be powered in this manner. An exemplary device of this type is a modem 109.

Further there is a connection port 105 for the connection of a serial communications cable to the device.

In connection with the first aspect of the invention, a switch 106, called the "learn" switch, is provided for communicating to the device the fact that the standby threshold should be reset.

In connection with the second aspect, switch 106 represents a "wake up/modify" switch, provided for activating the device in the event that it has powered itself down.

Figure 2:
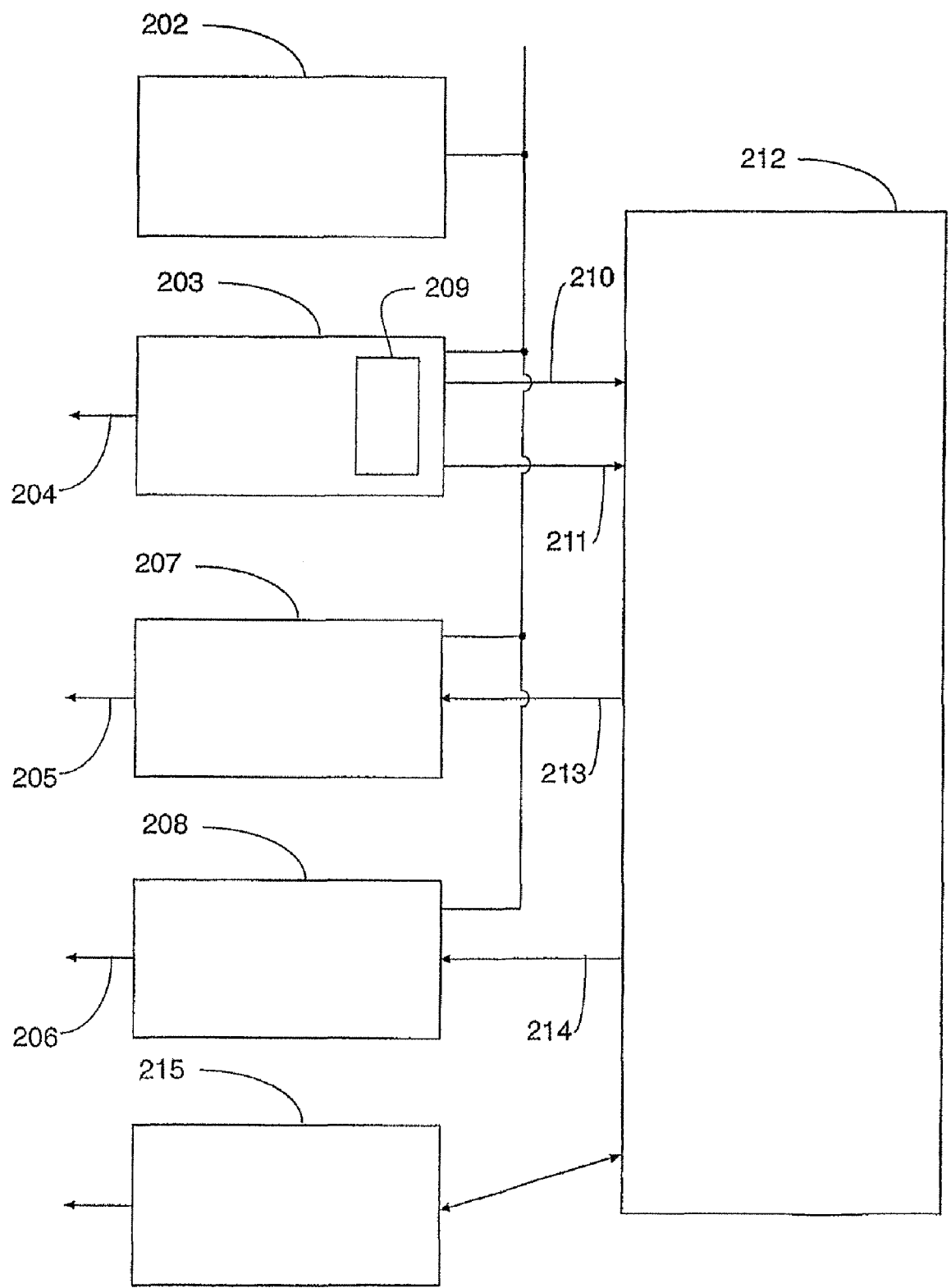
FIG. 2 is a block diagram showing the main functional blocks of an embodiment of the invention.

Considering FIG. 2, the main functional blocks of the device can be seen in block diagram form. There is a mains power inlet 201 which supplies power to a low voltage power supply 202. This supply provides power for the device's electronic components. Mains power is also supplied to the PC power module 203 which provides a non switched output 204 for powering the main electrical device which would usually be a desktop computer. A surge suppressor 202 protects the circuitry from mains power surges.

Mains power is also provided to controlled outputs 205 and 206 via switch means 207 and 208. The power supply to the non switched outlet 204 is monitored via state sensor 209. The state sensor provides signals proportional to the current and voltage drawn by the desktop computer to input 210 and 211 of microcontroller 212.

Thus the microcontroller is able to recognise the power usage levels of the computer and hence determine the operational (functional) state, namely:

(1) An Off state where the power draw is zero or very low, indicating the computer is off or in a non-operational power saving state. This state may mean that the device is completely switched off, functionally switched off, but still drawing a small amount of power through its power supply, or in a "hibernate" mode.

(2) A standby state in which the computer is drawing significantly more power than in its Off state, but significantly less than in its fully operational mode. This may be because the computer has entered a standby mode, in which some functionality (eg hard disk) is disabled so it draws less power, but is able to quickly respond to user input. It may also be in a situation where the user has made no use of the computer for an extended time, but the computer either does not have or does not enter a standby mode, due to the standby delay time settings or simply because standby has not been enabled.

(In a further embodiment relating to the second aspect, a standby state caused by user inaction may be separately identified from a standby state caused by the computer entering a standby mode. This will be referred to as User Inaction Standby State.)

Other operational states with distinct power usage levels could also be identified.

(3) An On state in which the computer is performing operations.

Figure 6:
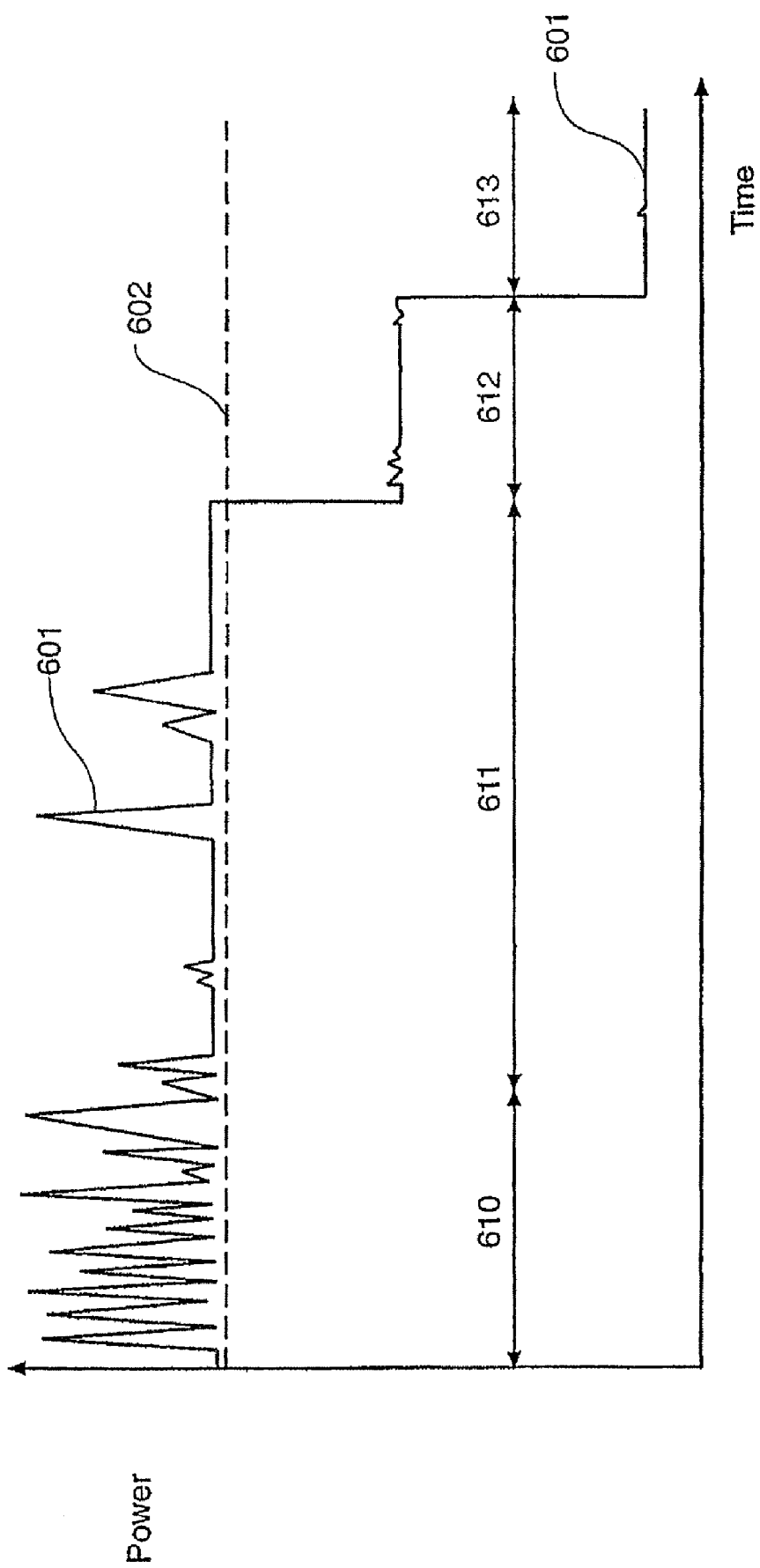
FIG. 6 is a plot of the power usage of a computer to which a device of the second aspect of the invention may be applied.

The microcontroller identifies these three or more states by continuous monitoring of the power usage of the computer. Referring now to FIG. 6, relating to the second aspect, there is shown a plot 601 of the power usage as measured by the device, plotted against time.

During time period 610, the computer is in use. The microcontroller monitors the power usage in order to dynamically determine a baseline power usage, plotted in FIG. 6 as plot 602, with frequent excursions to greater values. This baseline value, with excursions, is recognised by the power controller as corresponding to the On state.

The value of dynamically determining the baseline power draw is that the same power saver device may be used with differing pieces of equipment without the need to know beforehand the exact power draw which corresponds to the On state. This also means that altering components of the system, as for example fitting a more power efficient hard drive, would not cause the power saver device to incorrectly assume the computer had entered a standby mode.

During time period 611, the computer remains on, but is not in use. It does not enter a standby mode, perhaps because a user has not enabled this feature. It can be seen that the baseline power usage does not vary, but excursions from that baseline become rare. When the excursions are sufficiently few for a sufficiently long period, the microcontroller recognises this pattern as corresponding to the Standby state. In the further embodiment it will be recognised separately as User Inaction Standby state During period 612, the computer does enter a standby mode. The power consumption falls significantly. This is immediately recognised by the microcontroller as indicating Standby state.

During period 613, the computer is either turned off or enters a hibernate mode. Power consumption again falls significantly, to a very low or zero level. The power saver device recognises this as Off state.

Referring back to FIG. 2, the microcontroller 212 processes the signals and produces output signal 213 to turn on first controlled switch 207 only when On state is in force. A signal is produced at output 214 by the microcontroller to turn on second controlled switch 208 when the Standby state or the User Inaction Standby state (second aspect) is in force.

Thus first controlled switch 207 is on only when the computer is fully on, while second controlled switch 208 is on when the computer is in either an On state or a Standby state.

There is also provided a communications module 215 which allows direct data communication between the desktop computer and the power controller device. This may be used to update the microcontroller firmware to set or alter any variables held within the microcontroller, or to allow the computer to directly take on the function of the voltage and current detectors 209 and 210 and directly control switches 207 and 208.

Figure 5:
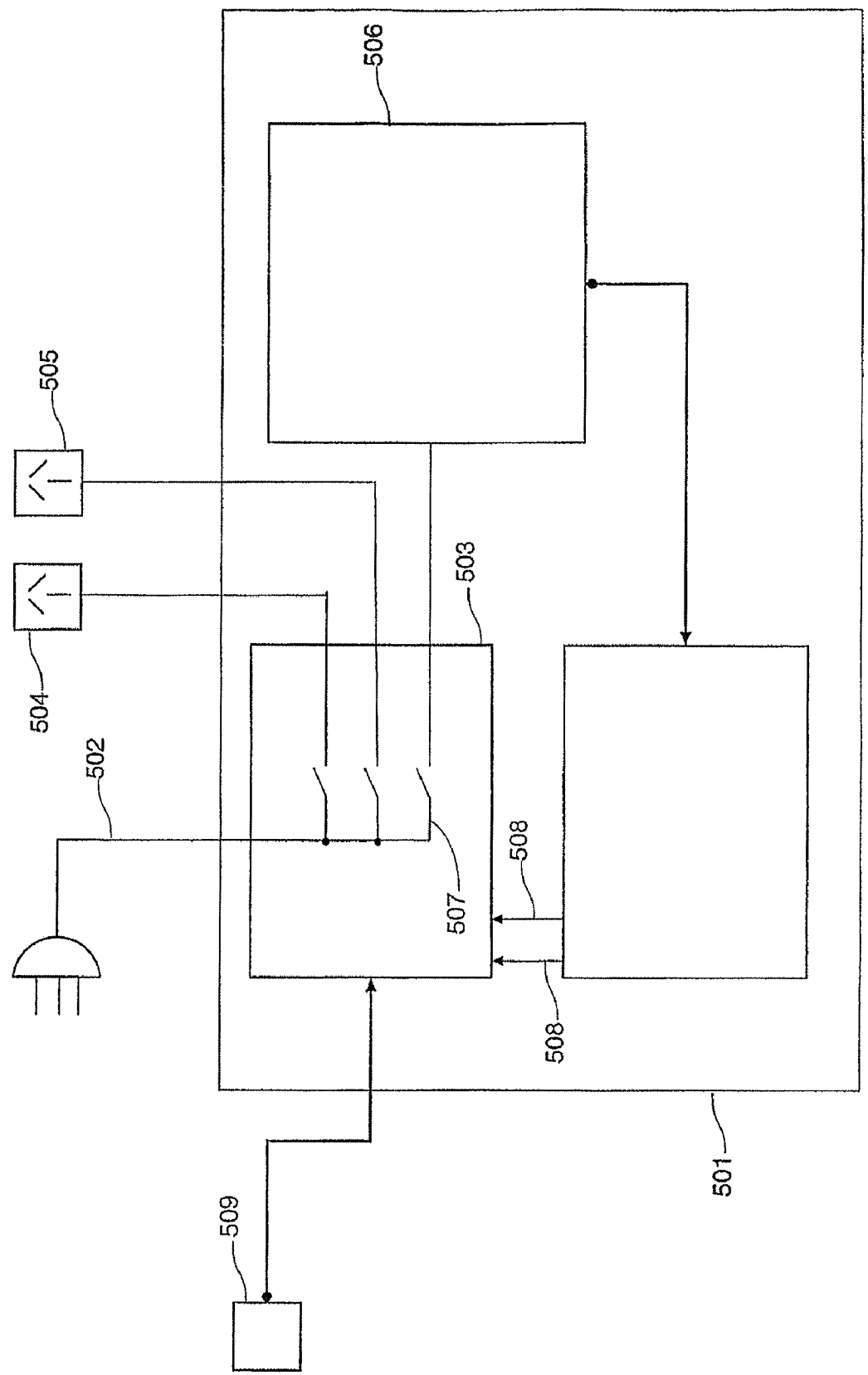
FIG. 5 shows a block diagram of a further embodiment wherein the device of the invention is contained within the case of a personal computer.

In a further embodiment, shown in block diagram form in FIG. 5, the functional element of the power saver device are contained within the case 501 of a computer.

In this case, the mains power inlet 502 is connected to the power saver device circuitry 503. The controlled power outlets 504, 505 are located on the outside of the case. The PC power supply 506 is supplied with power from the power saver device, either directly or via microcontroller controlled switch 507.

The power saver device and the PC power supply may be physically located in the same removable sub-housing within the computer case in order to keep all high voltage components together.

In this case, the computer main circuitry or motherboard may be equipped with data outputs 508 enabling direct communication with the power saver device circuitry.

The wake up/modify switch 509 (second aspect) is located on the outside of the computer case, or remotely. The switch may be an infrared sensor, adapted to sense a signal from an infrared remote control device.

Figure 3:
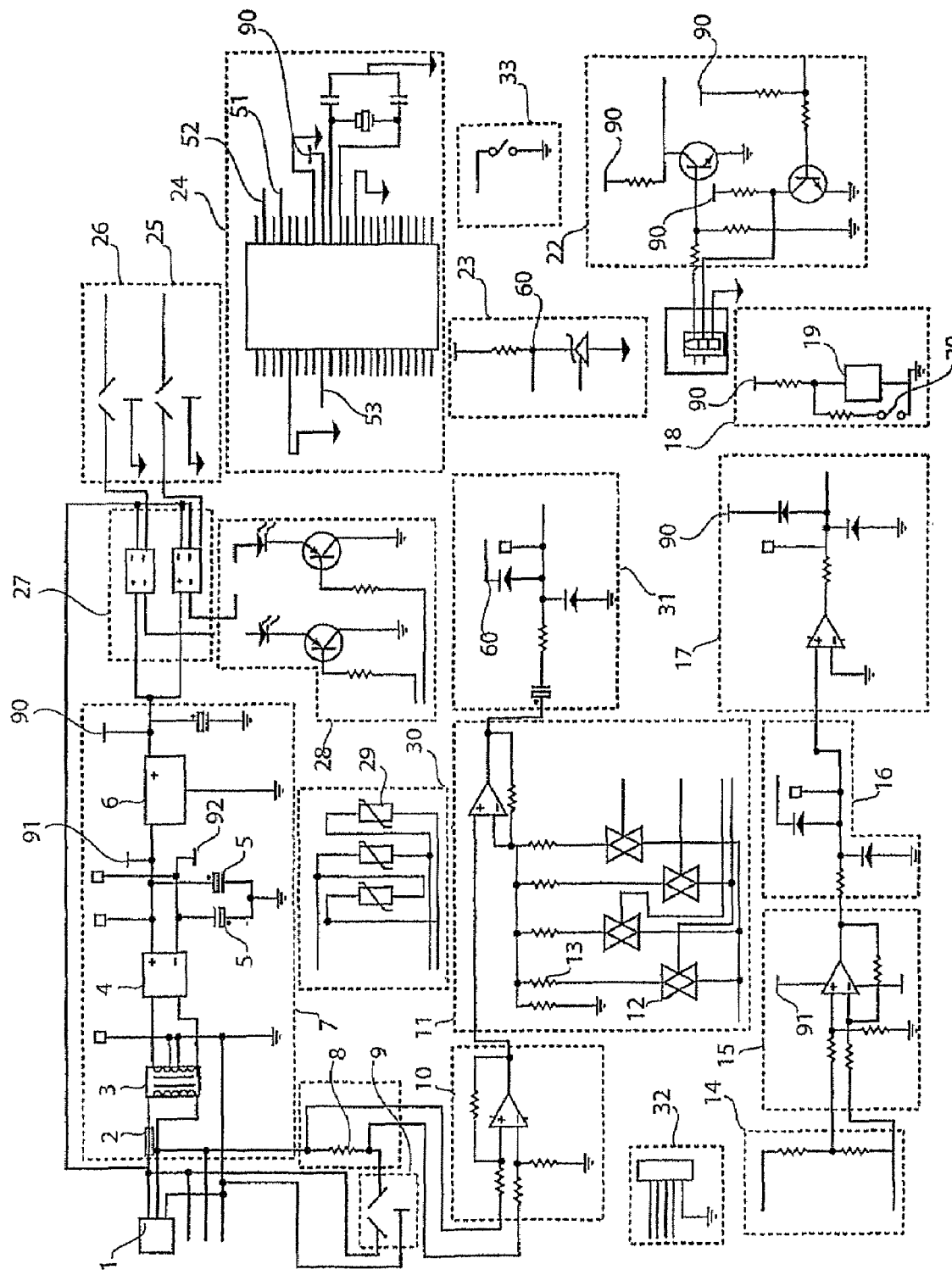
FIG. 3 is a circuit diagram relevant to an embodiment of the invention.

FIG. 3 shows a circuit diagram of an embodiment of the invention. There is a mains power supply plug 1 which provides power to the power supply device and also is the source of the power supply which is switched by the device to the peripheral and associated devices of the computer installation.

There is a low voltage power supply which is shown as block 7. This is made up of a fuse 2, a transformer 3, which has a mains voltage primary coil and two nine-volt secondary coils. DC rectification is provided by a bridge rectifier 4 and a linear voltage regulator 6. This provides a stable five-volt DC power supply, $V_{cc}$, 90, and a +12V supply, 91, and a −12V supply, 92.

The surge suppression circuitry 30 is connected in parallel with the power supply. It provides surge suppression using three metal oxide varistors 29 wired in a delta configuration to limit the maximum voltage between any two wires to the breakdown rating of the varistors.

The supply of power to the desktop computer which is supplied via the device of the invention, but is not switched by the device, is provided by power outlet 9. The neutral connection to this plug includes current sensing resistor 8. There is a current signal conditioning differential input amplifier 10. This transfers the reference for the current signal from neutral to earth. If this is not done the neutral connector would need to be connected to the common terminal of the power supply. Through any serial port connection, this would be connected to the neutral or earth conductor of the computer's internal power supply, which could cause unwanted tripping of residual current devices protecting the circuit.

The value of resistor 8 is chosen to be very low in order to reduce the power dissipated in the resistor. Accordingly there is a requirement for a current signal amplifier 11 in order to provide a referenced signal of sufficient magnitude. The gain of this amplifier may be varied under the control of microcontroller 24 by controlling analogue switches 12 in order to place one or more of resistors 13 in or out of circuit.

The current signal is further conditioned by the signal conditioning circuitry 31. A capacitor eliminates any DC offset in the amplifier output while a resistor and two diodes provide a current limit and voltage clamping so that the amplified current signal is in a fixed range about a reference voltage VAref, being the voltage at 60. The signal range is −0.3V to VAref +0.3V. The current detection signal is then applied to analogue to digital converter input 51 of the micro controller 24.

The incoming active and neutral are connected to the resistive divider 14 for the purposes of detection of the voltage applied to the desktop computer. Differential amplifier 15 shifts the reference for the voltage signal from neutral to earth in the same manner as is done by differential input amplifier 10 for the current signal.

The voltage signal is then applied to a conditioning circuit 16 which includes a current limiting resistor and clamping diodes which limit the signal to −0.3 v to var ref +0.3 v. The signal is applied to input 52 of the micro controller 24 which is configured to be the second channel of an analogue to digital converter.

A zero crossing detector 17 provides a signal to the micro controller 24 when the voltage is at zero. This allows the micro controller to ensure that measurements of the voltage and current signals are synchronised. A voltage reference is provided by an active precision voltage reference 23. This reference voltage is applied to the microcontroller to fix the upper limit of the analogue to digital converter.

Serial communications circuitry 22 allows for the connection of an RS 232 serial port. Solid-state relays 27 control the supply of power to switched power outlets 25, 26. The signals to switch the solid-state relay 27 are provided from the micro controller 24 via transistor buffers 28. The switch 33 is provided to connect the interrupt input 53 of the micro controller 24 to ground when the switch is activated. Software in the micro controller monitors the current/power consumed by the desktop computer and it controls the power outlets 25 and 26.

The microcontroller automatically detects and establishes power levels which correspond to the fully operational mode, standby mode and fully off mode of the desktop computer as described above in the description of FIG. 2.

Startup values for the power thresholds corresponding to each of the identifiable operational states of the computer are stored into e-prom. These values are used by the microcontroller at startup. For the second aspect, new values are continuously calculated based on the detected power usage of the computer.

When the microcontroller program determines that Standby state is in force then output 26 is energised, when On state is recognised then both outputs 25 and 26 are energised.

For the first aspect, these automatically determined values can be overwritten. This is achieved by pressing the "learn" switch 106 to place the device into a learning mode, and then placing the desktop computer into a standby state. The switch 106 is then pressed again. The value of the power being consumed by the desktop computer at this time is measured and this value is stored as the standby threshold. The PC is then switched off and the switch 106 pressed again. The micro controller stores this new level of current/power as the threshold indicating that the main computer is off.

The desktop computer power consumption is calculated by taking the voltage signal and the current signal which are applied to input 51 and 52 of the micro controller and multiplying the corresponding samples and applying the relevant calculation to calculate power. This power measurement gives a much more accurate indication of the power consumption of the desktop computer than a simple current measurement as it also takes into account any phase shift between the current and the voltage as well as waveshape.

Figure 4:
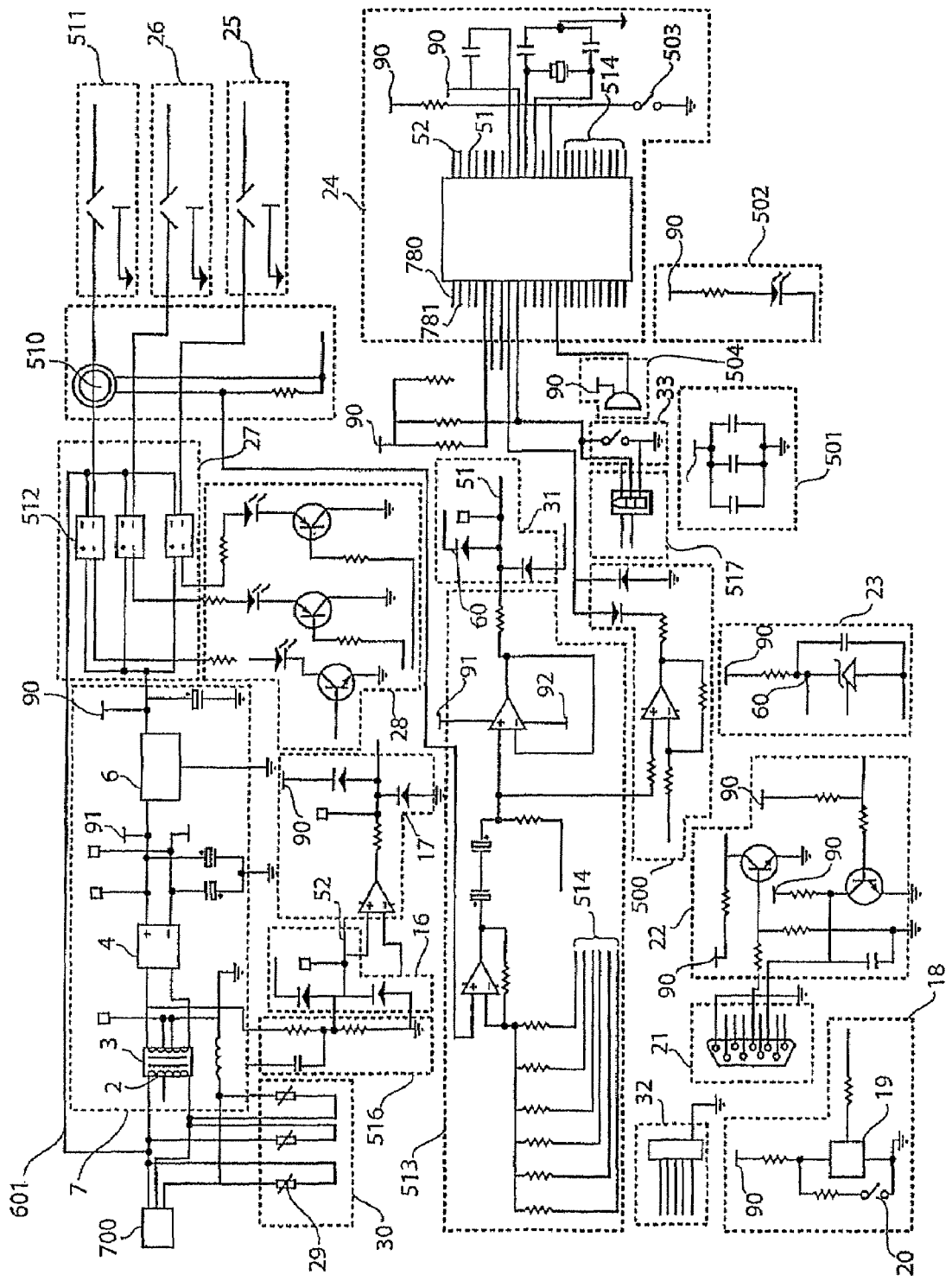
FIG. 4 shows a circuit diagram of a further embodiment of the invention.

FIG. 4 shows a further embodiment of the invention. This circuit operates in the same manner as that of FIG. 3, with the variations described below.

In some circumstances a user may require that power be withdrawn from the computer as well as the peripheral devices when the computer is turned off. This may be because, with modern computer power supplies which are software switched, the computer will continue to draw a small amount of power even when it has been instructed to switch off. Alternatively, some users are simply more comfortable with the knowledge that the computer is isolated from the mains power supply.

In this embodiment, the unswitched power outlet 9 is replaced by a power outlet 511 where the power supply to this outlet is controlled by the microprocessor 24 via solid state relay 512. This operates to remove power from outlet 511 as well as from outlets 25 and 26 when the microprocessor detects that the computer has shut down.

When this occurs, the computer ON/OFF switch is ineffective, since there is no power to the outlet 511 to which the computer is connected. In order to turn on the PC, the interrupt switch 33 is pressed which causes power to be supplied to power outlet 511 for a brief period (ten seconds in this case). If the PC is switched on during this time, current begins to be drawn through outlet 511 and the power control device is able to operate, supplying power to outlets 511, 25 and 26 as appropriate.

The PC ON/OFF 'soft' power switch may be eliminated, replaced or supplemented by interrupt switch 33. This is due to the fact that the PC bios may be setup for the PC to 'power up' as soon as mains power has been applied to it without the need to press the power ON/OFF switch.

A user may not wish this total shut down of power to occur. Accordingly, there is firmware provided to allow for two modes of operation. In one mode the switch 512 operates as described above. In the second mode, switch 512 is always on and the device behaves in the same manner as the circuit of FIG. 3. The firmware for the microprocessor 24 allows the interrupt switch 33 to be used to communicate which mode is to be employed. An interrupt extension socket 517 is provided to allow the interrupt switch to be placed remotely from the main power control device.

Where the main device is not a computer, but, for example, a piece of audio-visual equipment, or a video cassette recorder or perhaps a microwave oven, there may be equipment, such as a real time clock, a time display or an infra-red remote control detector which require ongoing, very small amounts of power.

This very small amount of power would normally be drawn from the mains. This requires that power be continue to be supplied to the device power supply. The minimum power draw of a power supply supplying just these loads is about 0.5 W. This is perhaps 50 times the actual power required to maintain the functions which cannot have power withdrawn from them.

Figure 7:
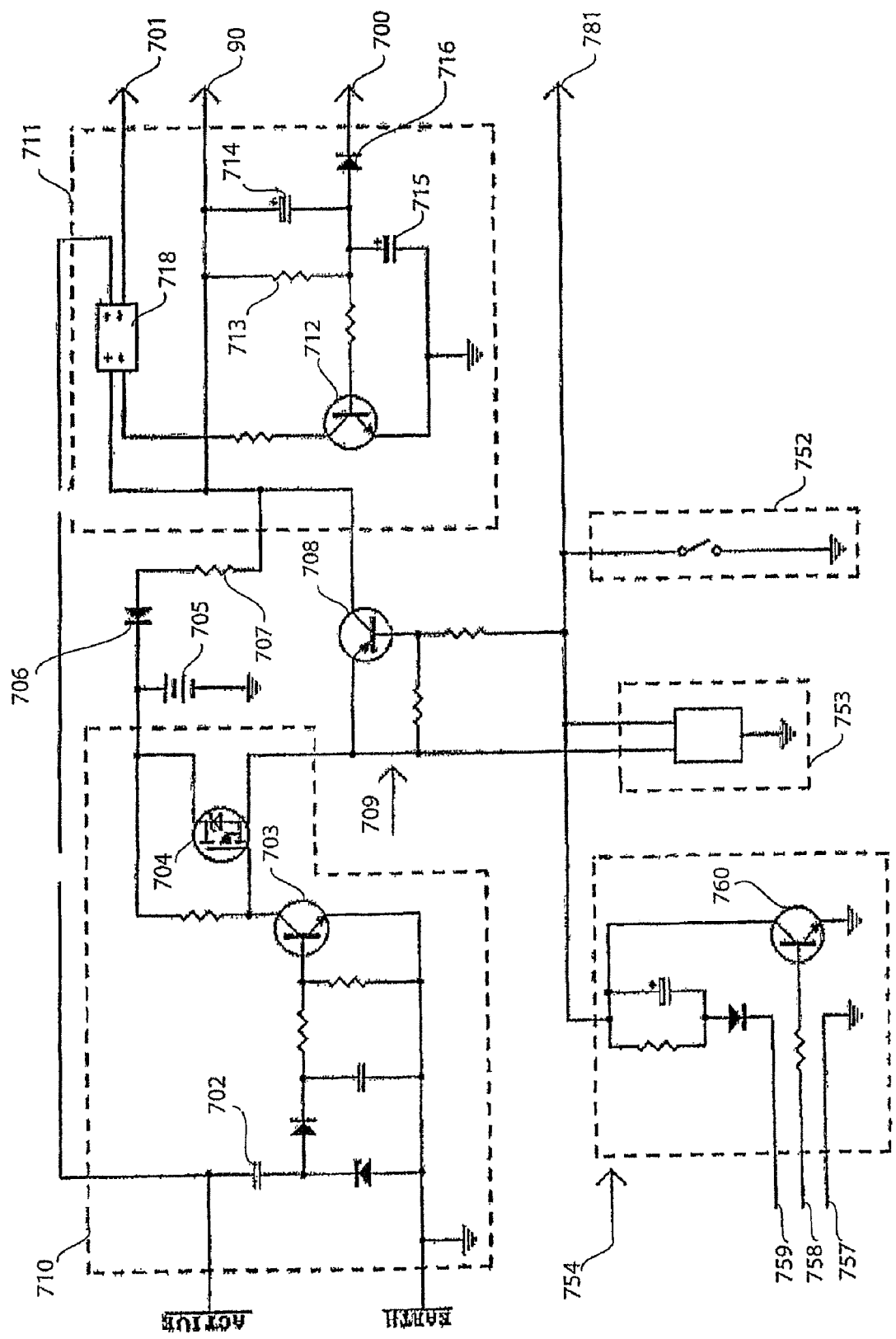
FIG. 7 shows a detail of an embodiment of the invention with zero mains power draw in Off mode.

In an embodiment of the invention as illustrated in FIG. 4, this small standby power requirement may be supplied from an energy storage device, such as rechargeable batteries or a storage capacitor. This storage device also provides power for a trigger to tell the power saver device to restore power to the main device. This allows for the power saver device to operate in the mode described above where power is removed from the main device when Off mode is detected, and wherein mains power is also withdrawn from the power saver device itself. Withdrawal of the power from the device is accomplished by mains power control 700. This may be a simple manual switch, or it may be as here, a control circuit under the control of microcontroller 24, as illustrated in FIG. 7. This could also be a relay under control of the main powered device, or of an independent control circuit.

The detail of the additional circuitry for the mains power control 700, is illustrated in FIG. 7. Battery activation functional block 710 detects that mains power is available. When it is available, it makes battery voltage available at point 709, otherwise the battery is disconnected. This ensures that battery power is not wasted by use at times when no mains power is available, and hence there is no possibility of the main device being called into use.

The presence of mains power provides sufficient current via capacitor 702 to turn on transistor 703, which in turn, turns on p-type MOSFET 704. Power from battery 705 is now available at point 709.

When control line 781 goes low, transistor 708 will conduct. This makes battery voltage available to Vcc 90, and the power save device circuitry is activated.

The function block 711 now provides temporary power for the power saver device circuitry. Relay 718 is activated. Battery is supplied to relay 718 directly via transistor 708. The RC network of resistor 713, resistor 717 and capacitor 714 drives transistor 712 which connects earth to the relay 718. The relay 718 is activated which connects incoming mains active to the active terminal 701 of power supply transformer 3, shown on FIG. 4.

Vcc 90 is now provided from mains power as described above. Trickle charging of the battery 705 is provided via resistor 707 and diode 706.

The presence of Vcc keeps transistor 712 on, which keeps relay 718 on and power continues to be supplied to the power saver device.

Control line 780 is connected to microcontroller 24, via protection diode 716. When the microcontroller program determines that the mains power should be withdrawn from the power saver device, control line 780 is taken low. Transistor 712 turns off, and relay 718 thereby also turns off. Power is withdrawn from the power saver device, and the inactive power usage is reduced to zero.

In order for the power saver device to be activated, control line 781, must go low. This is achieved by external, usually user initiated, action.

The simplest method is the manual switch shown as 752. Momentary activation of this switch will initiate the sequence described and power up the power saver circuit.

This switch can be an independent switch on the power saver device, or can be incorporated in the on/off switch of a controlled device.

Alternatively, the momentary low signal on control line 781 may be provided via a remote control receiver 753. This remote control device is powered from battery 705 whenever mains power is available. The remote control receiver 753 detects a user initiated use of an infra red or wireless remote control and provides a momentary low on control line 781.

This is particularly useful when the main controlled device is an audio visual device such as a television. Such devices are usually turned on by a remote control. The remote control detector need not decode the message from the remote control sender. It is sufficient that the remote control sender unit is in use to indicate that the user is likely to require that power be available to the main device. This solves one of the major problems of remote controlled devices with standby power requirements, such as televisions. Users are generally unwilling to manually turn the units on before use and off after use. In this case, the unit is off, with no standby power usage, but is turned on immediately the remote control is used, without requiring any additional action from the user. The normal action of the power saver device, removing power when the main device is unused, performs the turning off step, which users are equally unwilling to perform.

When the main device is one which has its own power supply and internal battery, such as a laptop computer, the circuit of functional block 754 may be employed. The positive supply of the laptop computer is connected to terminal 755, the common supply to terminal 757. Connected to terminal 756 is a control wire controlled by the laptop computer, which is active when the laptop computer is on. When this control wire is active, transistor 760 turns on, taking control wire 781 low and activating the power saver device.

As illustrated in the circuit of FIG. 4, the current sensing resistor 8 may be replaced by a current transformer 510. This has the advantage that the current sense signal is electrically isolated from the mains voltage. This eliminates the need for the current signal conditioning amplifier.

Differential amplifier 15 is also eliminated by providing a mains voltage sensor 516 which is connected to the power supply transformer 3. This mains voltage sensor provides a mains voltage signal to the conditioning circuit 16 which is as described for the embodiment of FIG. 3.

An output of the microprocessor 24 is used to drive Light emitting diode 502 to indicate the operational status of the device. A buzzer 504 is also provided under the control of the microprocessor 24 to allow status messages to be communicated to an operator.

A switch 503 is provided to signal to the microprocessor that it should enter a programming mode to allow reception of firmware upgrades.

The signal from the current transformer 510 is applied to current signal amplifier 513. The gain of this amplifier is controlled by the microprocessor 24 by using control lines 514 to connect selected resistors 515 into the earth path of the amplifier.

The power supply control device continuously monitors the reticulated mains voltage and supplies the result to the microcontroller. The microcontroller is programmed such that if the mains power deviates from a pre-determined range for a preset period of time, then switches 26 and 27 are operated in such a way that power is removed from all controlled outlets until such time as the voltage again stabilises within the pre-determined range for a preset period of time. This provides protection from mains supply Over-Voltage and Under-Voltage. The power supply control device samples the mains voltage and then calculates the True RMS Voltage. This means that the value will be measured correctly regardless of supply wave distortion. This method will work correctly for non sinusoidal voltages such as those produced by some solid state inverters.

The present invention may be used in connection with equipment observing and measuring only two power states, such as on and off or on and standby. Electrical devices typical of this are electrical audio devices visual display devices. This is to say that the present invention can function by observing and measuring at least two functional states of the device or group of devices as need be.

For example, an audio visual (AV) set up may consist of a number of individual components such as a TV screen, an amplifier and a DVD player, each of which may be required to be on in order for the unit to function correctly. The present invention, through monitoring True RMS power, is able to adapt to determine the various states of the equipment and their power needs, thereby dynamically responding to the changing power supply requirements when different components are attached to the power supply control device.

In this manner, the power supply control device can adapt to the changing needs of the electrical devices that are attached to it. For example, a user may at first attach a television power cord to the power supply control device, which will then automatically determine at least two functional states of the television. The determination of states of the single television unit is as explained in relation to the computer device, however, the user may then later add an additional electrical device, such as an amplifier that is to be connected to the television.

When the amplifier is first switched on it assumes a Standby mode. When mains power is applied, the power consumption is measured at a 'fast' rate and the Standby power for the device or collection of devices is extracted from this data. The algorithms used in the power supply control device analyse the absolute power measurements and power fluctuations to determine if any device is operating and out of standby mode. The lowest power measurement in the absence of power usage fluctuations is stored as the total standby power for the television and amplifier. This variable is then incremented by a certain amount so that any power reading below that value implies that both the television and amplifier are in standby mode.

This new value is referred to as the 'Modified Standby Power Level'. This allows for any 'noise' or inaccuracies in the measurements. When the power measurement for the device or collection of devices drops below the modified standby level for a period of time, for example 30 seconds, the power supply control device will remove mains power from the AV system.

The Standby power level is again confirmed when the power supply control device re supplies power to all devices placing them in an OFF Standby state while making sure there are no power fluctuations.

The absence of power fluctuations and a decrease in steady state power below the computed standby value implies a reduction in the number of collective devices while an increase steady state power in the absence of power consumption fluctuations implies an increase in the number of electrical devices in the collection connected to the power supply control device.

In this case power is not immediately removed from the television system but in the absence of any remote control activity for a period of say 3 hours, power is removed from the AV system. Power is then re-applied for the purpose of computing the standby power level for this new configuration.

Figure 8:
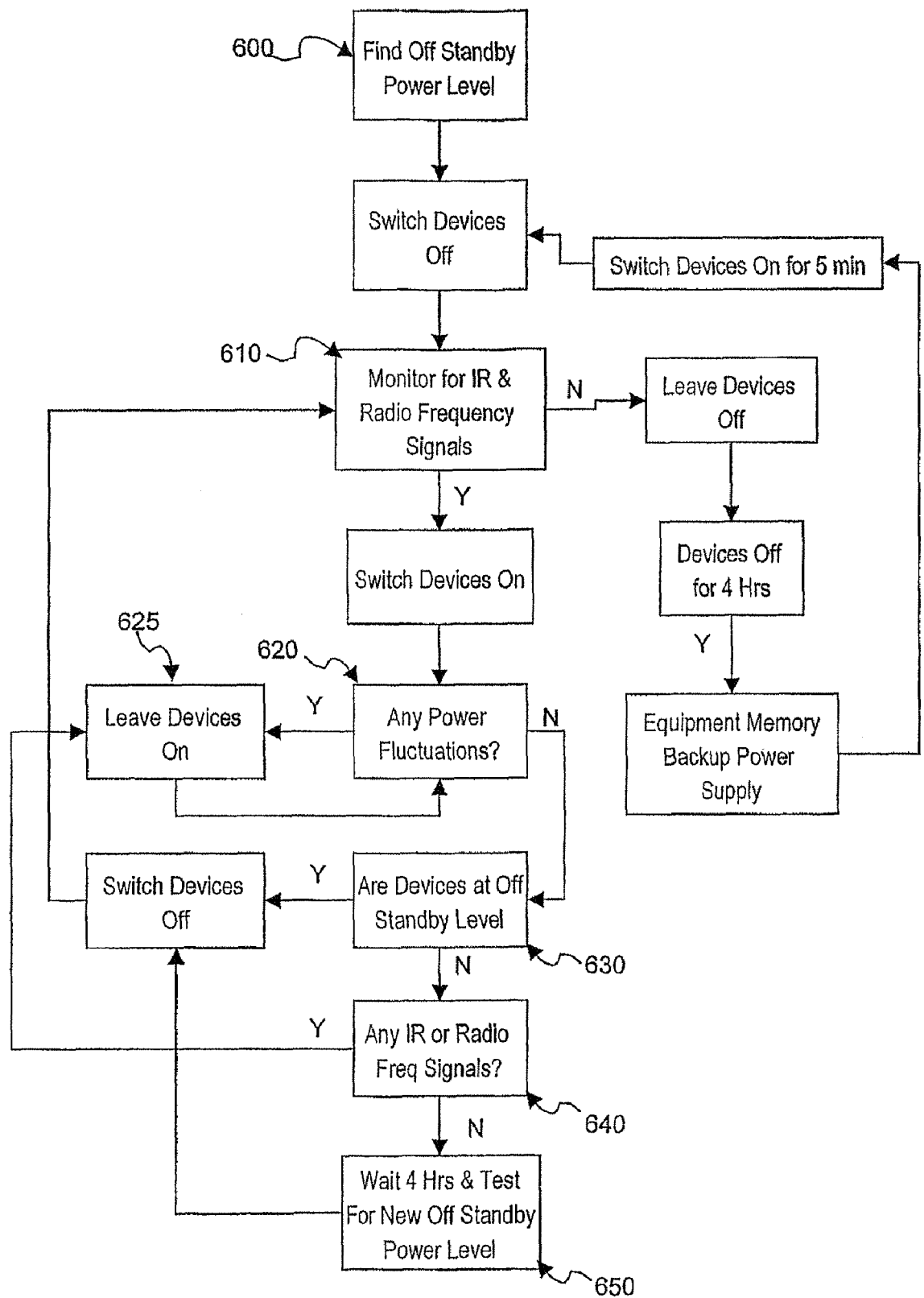
FIG. 8 shows a flowchart of an embodiment of the present invention in relation to use with audio-visual equipment.
Figure 9:
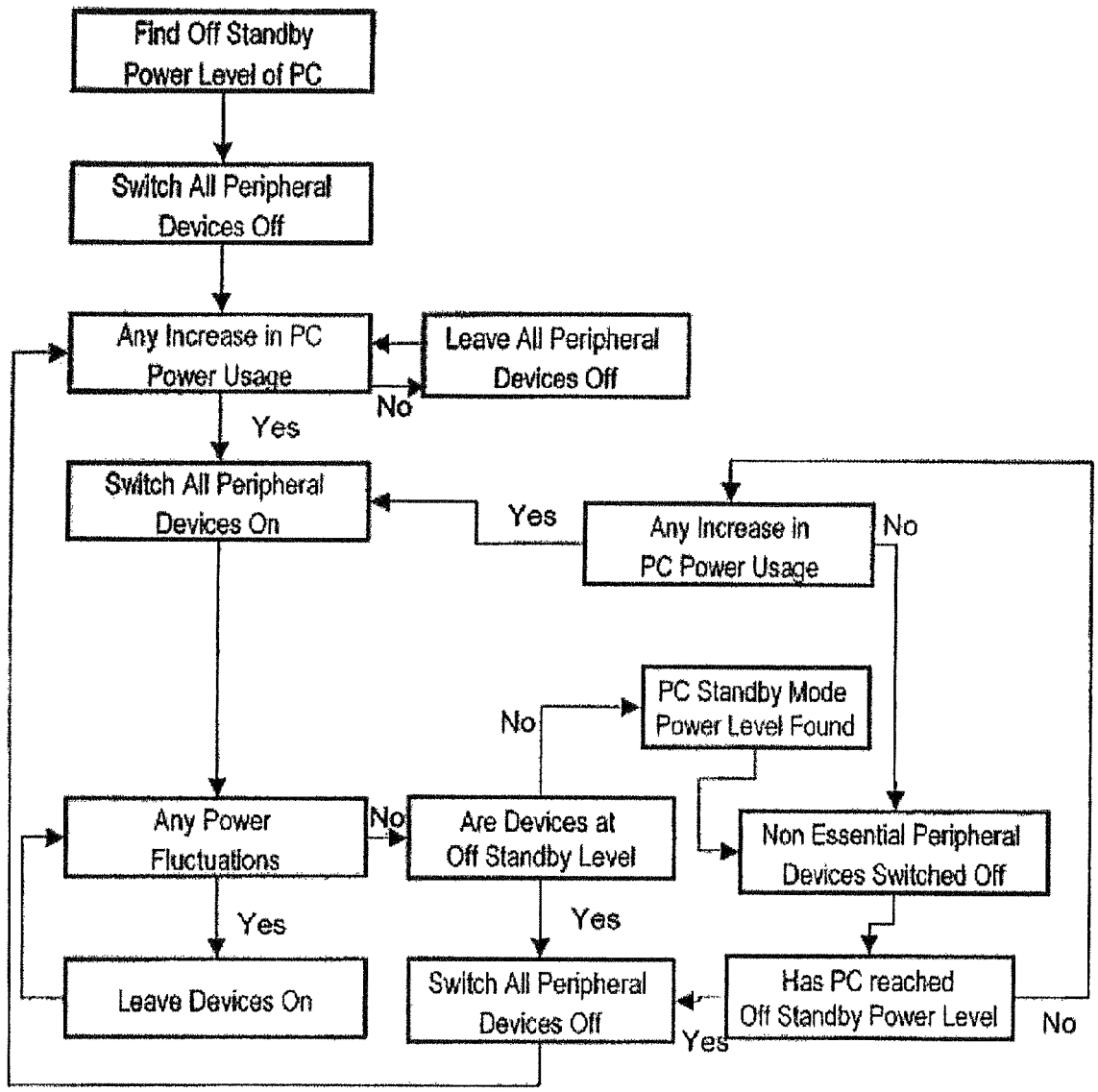
FIG. 9 shows a flowchart of an embodiment of the present invention in relation to use with computer equipment.

FIG. 8 shows a flow chart of this method in comparison with the method shown in FIG. 9, which is for computer electronic devices.

FIG. 8 shows a method of the present invention in which the first step 600 is when the power supply control device finds the Off Standby Power Level, which is the level of power or cumulative level of power used by the device or devices attached thereto. The power supply control device then waits 610 to receive a signal from a remote device, such as an IR or radio frequency signal from a remote device, and once received power is supplied to all the attached devices.

Power usage of the devices is then continuously monitored through real time monitoring and fluctuations in power 620 are detected the system then determines that the device is active and operating and the power to the device is maintained 625. If no power fluctuations are observed then the power supply control device determines if the power level matches that of the predefined Off Standby Level at step 630.

If the power measurement matches the predefined Off Standby Level then the power to the devices is then shut off and the systems return the step 610 monitoring for IR or radio frequency. If the devices are determined not to be at Off Standby Level, such as when a steady state power level is observed with no power fluctuations then the system then looks for any remote IR or radio frequency signals that would be an indication of use at step 640. If such signals are observed then power to the devices is left on, step 625, but if no signals are observed by the system for a predefined period, for example 4 hrs, step 650, and if no activity is monitored during this time then the system determines that the observed power usage may be the New Standby Power Level and all devices are switched off. The system then re supplies power to the devices and monitors the power usage of the devices. If a steady state is observed with no power fluctuations then the system determines that this is the New Standby Power level. The system will then removes power from the devices and the monitoring of IR and radio frequencies signal, step 610, is continued.

In this manner it is then possible to add additional electronic devices to the power supply control device or remove electronic devices from the power supply control device and the system will then be able to continuously monitor the cumulative power needs of the devices and as required establish new Off Standby Power Levels required for the devices. This enables the system to be dynamic and self-learning, avoiding the need for the user to continuously change settings and monitor any power usage.

The power supply control device is thus able to adapt to change in power usage because:
1. Power consumption in equipment when in Standby Mode has very minor or no power level fluctuations.
2. Power consumption in equipment when operating has significant power level fluctuations.
3. The power supply control device is able to sample and measure True RMS Power in a very short time, thus enabling it to monitor power fluctuations which indicate that a device is operating and hence not in Standby mode.

True RMS power monitoring requires that the power supply control device is able to determine the operational state of the attached electronic device or devices. The RMS power is an average measurement of power over a defined period of time. In mains electrical power measurements the smallest interval of power measurement which is useful in determining power consumption is half (0.5) a cycle of the mains power frequency, i.e. 10 ms @ 50 Hz. Hence an instantaneous measurement of RMS power in this application can be an average over 10 ms to 5 seconds and is typically less than 0.5 seconds.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A power supply control device characterized in that there are provided:
   a plurality of controlled electrical outlets;
   a single electrical input adapted to connect to a supply electrical outlet;
   switch means adapted to connect an electrical supply from the supply electrical outlet to each of the controlled electrical outlets in response to a functional state of a master electrical device,
   a state sensor adapted to detect a the functional state of the master electrical device, said sensor being adapted to distinguish at least two functional states of the master device, said sensor comprising a current-sensing element adapted to sense the value of current flow through the master device and a voltage-sensing element adapted to separately sense voltage across the master device for calculation of the power consumption of the master device.

2. The power supply control device of claim 1 wherein the at least two functional states of the master device are standby and fully on.

3. The power supply control device of claim 1 wherein the state sensor is adapted to distinguish three functional states of the master device being off, standby and fully on.

4. The power supply control device of claim 1 wherein the state sensor is adapted to use threshold levels of the master device current flow value and the voltage value to determine the state of the master device.

5. The power supply control device of claim 4 wherein the state sensor is adapted to permit the threshold levels at which it distinguishes standby or on or off modes of the master device to be set by a user.

6. The power supply control device of claim 1 wherein the state sensor is adapted to receive digital information from the master device indicating its actual or intended functional state.

7. The power supply control device of claim 1 wherein the state sensor is adapted to monitor the state of any port of the master device in order to determine the state of the master device.

8. The power supply control device of claim 7 wherein the port is a serial port, a parallel port or a USB port.

9. The power supply control device of claim 1 wherein at least one controlled electrical outlet continues to provide an electrical power supply while the state sensor indicates that the master electrical device is in an off or standby or on state.

10. A method of controlling power to at least one electrical device using the power supply control device of claim 1, the method including the steps of:
    connecting at least one electrical device to the power supply control device;
    determining a first cumulative standby power level being the power consumption calculated for the electrical device when the electrical device is in a standby power mode;
    monitoring the calculated power consumption to detect fluctuations in the power consumption of the at least one attached electrical device;
    while power fluctuations are detected, maintaining power supply to the at least one attached electrical device;
    when power fluctuations are not detected, comparing the calculated power consumption to the first cumulative standby power level;
    if the calculated power consumption is less than the first cumulative standby power level, removing power supply from the at least one attached electrical device.

11. The method of claim 10, further including the steps of:
    attaching an additional electrical device to the power supply control device;
    determining a second cumulative standby power level being the combined power consumption calculated for the attached electrical devices when the electrical devices are in a standby power mode by:
        monitoring the combined calculated power consumption for fluctuations in the power consumption by the at least one attached electrical device and additional electrical device;
        while power fluctuations are detected, maintaining power supply to the at least one attached electrical device and additional electrical device;
        when power fluctuations are not detected, removing power from all attached electrical devices;
        after a time period, resupplying power to the attached electrical devices;
        the sensor calculating a resupply power consumption upon said resupply of power, said resupply power consumption being the second cumulative standby power level;
    while power fluctuations are detected, maintaining power supply to the attached electrical devices;
    when power fluctuations are not detected, comparing the calculated power consumption to the second cumulative standby power level;
    if the calculated power consumption is less than the second cumulative standby power level, removing power supply from the attached electrical devices.

12. The method of claim 10, further including the steps of: a. after power fluctuations have not been detected then; b. monitoring for remote activity of a remove device operatively associated with the power supply control device wherein detecting remote activity will result in continuation of power supply to the electrical devices.

13. A power supply control device characterized in that there are provided:
    a plurality of controlled electrical outlets;
    a single electrical input adapted to connect to a supply electrical outlet;
    a power sensor comprising a current-sensing element adapted to detect current flow through a master electrical device and a voltage-sensing element adapted to separately sense voltage across a master electrical device to detect power use and to produce a power use signal,
    a computer processor adapted to process said power use signal to determine at least two functional states of the master electrical device,
    switch means controlled by the computer processor adapted to connect an electrical supply from the supply electrical outlet to each of the controlled electrical outlets, which of the controlled electrical outlets to be connected to the electrical supply being determined by a determined functional state.

14. The power supply control device of claim 13 wherein the at least two functional states of the master device include standby, and fully on.

15. The power supply control device of claim 14, wherein the master device includes the third functional state off.

16. The power supply control device of claim 13, wherein the functional states of the master device are selected from the functional states of off, standby, user inaction standby and fully on or in use.

17. The power supply control device of claim 13 including second switch means controlled by the computer processor adapted to remove mains power from the power supply control device, further including power storage means sufficient to allow powering of circuitry to return power to the power supply control device when required by a user or external device.

18. The power supply control device of claim 13 wherein the computer processor is adapted to receive digital information from the master device indicating its actual or intended functional state.

19. The power supply control device of claim 13 wherein the computer processor is adapted to monitor the state of any port of the master device in order to determine the functional state of the master device.

20. The power supply control device of claim 19 wherein the port is a serial port, a parallel port or a USB port.

21. The power supply control device of claim 13 wherein at least one controlled electrical outlet continues to provide an electrical power supply while the master electrical device is in an off or a standby state.

22. The power supply control device of claim 13 wherein at least one controlled electrical outlet is controlled such that it does not provide an electrical supply when the master electrical device is in a standby state, but does provide an electrical supply when the master device is in an on state.

23. The power supply control device of claim 13 wherein the power use signal is a measurement of power over a predefined time.

24. The power supply control device of claim 13, wherein the predefined time is a time interval of between 5 milliseconds and 5 seconds.

25. The power supply control device of claim 23, wherein the predefined time is a time interval of between 10 milliseconds and 1 second.

26. The power supply control device of claim 23, wherein the predefined time is a time interval of 10 milliseconds.

27. The power control supply device of claim 13, wherein the master electrical device is represented by a plurality of electrical devices.

* * * * *